Jan. 15, 1952 C. E. G. BAILEY 2,582,668

DEVICE FOR SYNCHRONIZING THE FREQUENCY OF AN OSCILLATOR TO A CONTROL OSCILLATION

Filed March 23, 1949

INVENTOR
CHRISTOPHER EDMUND GERVASE BAILEY
BY Fred M Vogel
AGENT

Patented Jan. 15, 1952 2,582,668

UNITED STATES PATENT OFFICE 2,582,668

DEVICE FOR SYNCHRONIZING THE FREQUENCY OF AN OSCILLATOR TO A CONTROL OSCILLATION

Christopher Edmund Gervase Bailey, London, England, assignor to Hartford National Bank and Trust Company, Hartford, Conn., as trustee Application March 23, 1949, Serial No. 83,016
In Great Britain March 10, 1948

5 Claims. (Cl. 250—15)

The invention relates to a device for synchronizing the frequency of an oscillator to a control oscillation, more particularly for synchronizing the frequency of a transmitter to the frequency of a standard transmitter, a control-voltage being produced which, through a frequency corrector, controls the frequency of the oscillator.

Such devices are of utility, for example in systems of transmitters of the kind say of "Gleichwellen" systems and transmitter networks for frequency-modulated transmitters.

The device according to the invention is distinguished by the feature that the control-voltage is taken from a phase-discriminator to which the output voltages of an amplitude demodulator and a frequency demodulator are supplied, these two demodulators having supplied to them not only the oscillation produced by the oscillator but also the oscillation modulated by a pilot signal.

In order that the invention may be more clearly understood and readily carried into effect, it will now be described more fully with reference to the accompanying drawing.

Figure 1:
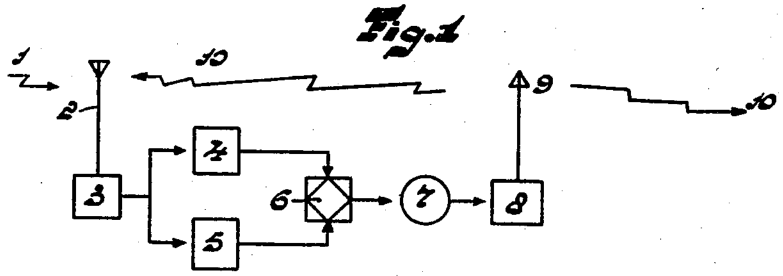
Fig. 1 shows a diagrammatic view of a device according to the invention, the operation of which will be set out more fully with reference to Figs. 2 to 7.

According to Fig. 1, signals 1 of a standard transmitter and signals 10 from an extension transmitter are received with the use of an aerial 2.

From economical considerations it will usually be preferred to arrange the aerial 2 in the proximity of the extension transmitter. If such is the case, the strength of signal 10 may be materially higher than that of signal 1. In order that in this case the receiver 3, which is connected to the aerial 2, may not be overloaded, it is advantageous to reduce the ratio in strength of these two signals, for example by giving a directional characteristic to the aerial 2.

Figure 2:
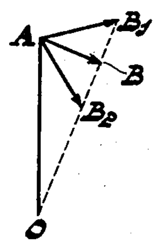
Figure 3:
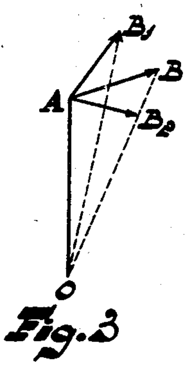
Figure 4:
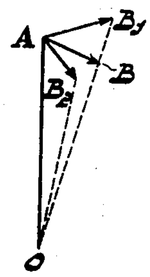

The receiver 3 may be either of the straight or of the superheterodyne type. In either case the vector representing the high-frequency or intermediate-frequency output voltage of the receiver will consist (as shown in Fig. 2) of the sum of the vector OA from the extension transmitter and of the vector AB from the standard transmitter. Assuming the sum vector OB to be at right angles to the vector AB, it is obvious that if the vector AB is phase-modulated by a pilot signal, so that this vector takes up positions lying between the extreme positions $AB_1$ and $AB_2$, the resultant is amplitude-modulated between the extreme values $OB_1$ and $OB_2$ with the frequency of the pilot signal and phase-modulation with this frequency does not take place. If the angle ABO is slightly smaller than 90°, the resultant as may be seen from Fig. 3, will exhibit not only amplitude-modulation of the same polarity as before but also phase-modulation, the polarity of which is determined by the fact that $OB_1$ is situated to the left of $OB_2$. However, if angle ABO is slightly larger than 90° (as shown in Fig. 4), the resultant will again exhibit amplitude-modulation of the same polarity but now together with phase-modulation of opposite polarity, since $OB_1$ is now situated to the right of $OB_2$.

The output signal of the receiver 3, which signal corresponds to the variation between $OB_1$ and $OB_2$, is then supplied both to an amplitude demodulator 4 (Fig. 1) and to a frequency demodulator 5. The output voltage of the frequency demodulator 5 is, consequently, zero if AB is at right angles to OB and reverses its polarity when AB turns through this position with respect to OB. The output voltage of the amplitude demodulator 4 is constant polarity.

The output voltages of the demodulators 4 and 5 with pilot signal frequency are supplied, preferably through filters cutting off components with different frequencies, to a phase discriminator 6, which may be constructed, for example, in the form of a ring demodulator. The output voltage of the phase discriminator 6 will thus be constituted by a direct voltage, the polarity of which reverses simultaneously with the reversal of the polarity of the output voltage of the frequency demodulator 5. This control-voltage occurring across the output of the phase discriminator is then supplied to a control-device 7, which corrects the frequency of an extension transmitter 8. The signal 10 of the extension transmitter 8 is emitted by an aerial 9.

If the frequency of the pilot signal is chosen to be higher than the highest intelligence-modulation frequency to be transmitted and if the output circuits of the demodulators 4 and 5 and the input circuit of the phase discriminator 6 have connected between them filters which allow the passage of signals of pilot frequency only, the frequency corrector 7, which is preferably constructed as a reactance tube, may be used in addition for controlling the instantaneous frequency of the extension transmitter 8 in accordance with the frequency modulation produced in the standard transmitter by the intelligence signal.

Figure 8:
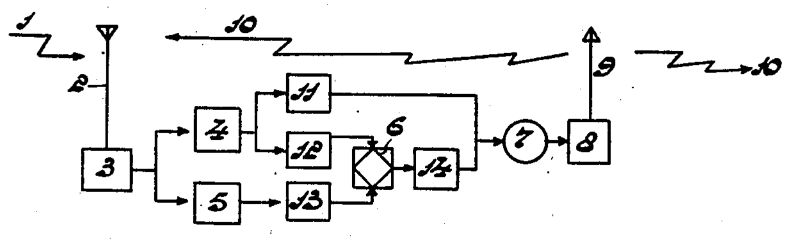
Fig. 8 shows, in block diagram form, an alternative embodiment of the device according to the invention.

An alternative embodiment of the device according to the invention is shown in Fig. 8, the reference numerals 1 to 10 designating, parts corresponding to those of the device shown in Fig. 1. Connected between the output circuits of the demodulators 4 and 5 and the input circuit of the phase discriminator 6 are bandpass filters 12 and 13, respectively, which allow the passage of the pilot frequency only and does not allow the passage of the frequencies of the intelligence signals. A low-pass filter 14, connected between the phase discriminator 6 and the frequency corrector 7, allows the passage of direct voltage and frequencies lower than of intelligence signals, whereas the band-pass filter 11 connected between the output of the amplitude demodulator 4 and the frequency corrector 7 allows the passage of signals with intelligence frequency but not of pilot frequency or of direct voltage. In this device the pilot frequency is not restricted to a value exceeding that of the intelligence signals but instead may be chosen to be lower than or equal to one of these frequencies.

The output voltage of the phase discriminator 6 controls the central frequency of the extension transmitter in the manner described with reference to Fig. 1, so that this central frequency corresponds to the central frequency of the standard transmitter. The variation in the frequency of the standard transmitter due to the frequency modulation with the intelligence signals produces an output voltage of the amplitude demodulator 4, which, fed to the frequency corrector 7, controls the instantaneous frequency of the extension transmitter 8. Since a direct voltage component is not passed by the filter 11, there is not the difficulty that the output voltage varies owing to variations in the directional characteristic curve of the aerial 2 or in the amplification factor of the receiver 3.

Figure 5:
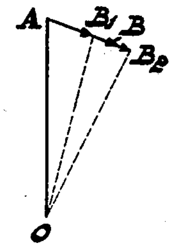
Figure 6:
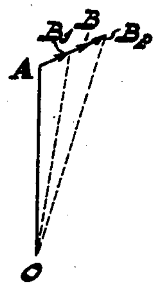
Figure 7:
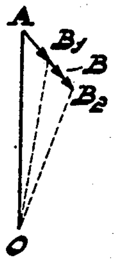

As shown in Figs. 5, 6 and 7, the device may also be used, if the amplitude of the control-oscillation from the standard transmitter is modulated by the pilot signal. In this case the vector AB is amplitude-modulated between the values $AB_1$ and $AB_2$. The resultant is consequently phase-modulated between the positions $OB_1$ and $OB_2$. If the angle ABO is right, $OB_1$ and $OB_2$ are equal, so that amplitude modulation does not occur. If the angle ABO is smaller than 90° (Fig. 6), $OB_2$ exceeds $OB_1$ in length and if the said angle exceeds 90° (Fig. 7), $OB_1$ is the larger of the two vectors. The output signal with pilot frequency thus consists of phase modulation with constant polarity and amplitude-modulation the polarity of which reverses and becomes zero when the two signals form a right angle.

What I claim is:

1. Apparatus for synchronizing the frequency of an oscillation generator with that of standard oscillations modulated by a pilot signal and other signals, said apparatus comprising means to combine the generated oscillations with the standard oscillations to produce a resultant wave, means to frequency-demodulate the resultant wave and to extract solely a first pilot signal component therefrom, means to amplitude-demodulate the resultant wave and to extract solely a second pilot signal component therefrom, a phase discriminator, means to apply said first and second components to said discriminator to produce a control voltage, and means to control the frequency of said generator in accordance with said control voltage.

2. Apparatus for synchronizing the frequency of an oscillation generator with standard oscillations modulated by a pilot signal comprising means to combine the generated oscillations with the standard oscillations to produce a resultant wave, a frequency detector coupled to said combining means, a first filter coupled to the output of said frequency detector to derive therefrom a first pilot signal component, an amplitude detector coupled to said combining means, a second filter coupled to the output of said amplitude detector to extract a second pilot signal component therefrom, a phase discriminator coupled to the outputs of said first and second filters to produce a control voltage depending on the phase difference between said components, and means to control the frequency of said generator in accordance with said control voltage.

3. Apparatus for synchronizing the frequency of an oscillation generator with standard oscillations phase modulated by a pilot signal comprising receiving means to combine the generated oscillations with the standard oscillations to produce a resultant wave, a frequency-demodulator coupled to said receiving means, a first filter coupled to the output of said frequency-demodulator to derive therefrom a first pilot signal component, an amplitude-demodulator coupled to said receiving means, a second filter coupled to the output of said amplitude-demodulator to extract a second pilot signal component therefrom, a phase discriminator coupled to the outputs of said first and second filters to produce a control voltage depending on the phase difference between said components, and means including a reactance tube to control the frequency of said generator in accordance with said control voltage.

4. Apparatus for synchronizing the frequency of an oscillation generator with standard oscillations amplitude modulated by a pilot signal comprising receiving means to combine the generated oscillations with the standard oscillations to produce a resultant wave, a frequency-demodulator coupled to said receiving means, a first filter coupled to the output of said frequency demodulator to derive therefrom a first pilot signal component, an amplitude-demodulator coupled to said receiving means, a second filter coupled to the output of said amplitude-demodulator to extract a second pilot signal component therefrom, a phase discriminator coupled to the outputs of said first and second filters to produce a control voltage depending on the phase difference between said components, and means including a reactance tube to control the frequency of said generator in accordance with said control voltage.

5. Apparatus for synchronizing the frequency of an oscillation generator with that of standard oscillations modulated by a pilot signal and frequency-modulated by an intelligence signal, the frequency of the pilot signal being higher than the highest frequency in said intelligence signal, said apparatus comprising receiving means to combine the generated oscillations with the standard oscillations to produce a resultant wave, a frequency detector coupled to the output of the receiving means, a first filter coupled to the output of said frequency detector to extract solely a first pilot signal component therefrom, an amplitude detector coupled to the output of said receiving means, a second filter coupled to the output of the amplitude modulator to extract solely a second pilot signal therefrom, a phase discriminator, means to apply said first and second components to said discriminator to produce a control voltage, a reactance tube coupled to said generator to control the frequency thereof in accordance with an applied voltage, means to apply said control voltage to said reactance tube to effect correction of the frequency of said generator, a third filter coupled to the output of said amplitude detector to derive solely the intelligence signal component therefrom, and means to apply said intelligence signal component to said reactance tube to modulate the frequency of said generator accordingly.

CHRISTOPHER EDMUND GERVASE BAILEY.

REFERENCES CITED

The following references are of record in the file of this patent:

UNITED STATES PATENTS

| Number | Name | Date |
|---|---|---|
| 2,028,880 | Runge et al. | Jan. 28, 1936 |
| 2,114,036 | Smith et al. | Apr. 12, 1938 |
| 2,173,902 | Gerth et al. | Sept. 26, 1939 |
| 2,377,326 | Crosby | June 5, 1945 |
| 2,462,857 | Ginzton et al. | Mar. 1, 1949 |